Dec. 30, 1969　　　W. G. DOWNING, JR　　　3,487,205
CONTROLLED FIELD LIGHT-PROBE ELECTRONIC ANALOG
COMPUTER AND FUNCTION GENERATOR
Filed July 27, 1967　　　　　　　　　　　2 Sheets-Sheet 1

INVENTOR.
WILLIS G. DOWNING JR.

BY

ATTORNEY

United States Patent Office

3,487,205
Patented Dec. 30, 1969

---

3,487,205
CONTROLLED FIELD LIGHT-PROBE ELECTRONIC ANALOG COMPUTER AND FUNCTION GENERATOR
Willis Gess Downing, Jr., Livermore, Calif., assignor to the United States of America as represented by the United States Atomic Energy Commission
Filed July 27, 1967, Ser. No. 656,997
Int. Cl. G06g 7/26; H01l 15/00
U.S. Cl. 235—198                                    11 Claims

ABSTRACT OF THE DISCLOSURE

A device is described herein for sampling, by means of an electromagnetic probe, the potential at any location on a controlled electric field analog voltage plot which is generated in the plane of a moderately conductive film. A photoelectric layer is disposed between this film and a highly conductive contact tier, such that a beam of electromagnetic radiation, directed through the film, impinges on the photoelectric layer and decreases the resistance thereof exclusively at the localized beam position, thus substantially connecting this position on the film with the contact. The electrical signal associated with the contact is monitored to provide a measure of the potential present on the film for any selected beam position thereon.

BACKGROUND OF THE INVENTION

The invention described herein was made in the course of, or under, Contract No. W-7405-ENG-48, with the United States Atomic Energy Commission.

The present invention relates to analog computation devices, and more particularly to a controlled electric field analog device utilizing a beam of electromagnetic radiation as a probe element.

Since the discovery that seemingly unrelated physical systems may be characterized by the same mathematical equations, analog theories and devices have become of practical importance in solving scientific and engineering problems. Pertinent to the instant invention are those analog devices commonly referred to as controlled electric field analog systems. A conventional electrolytic analog tank provides a specific example of such a controlled field device. In other embodiments, a solid conductive medium is employed in place of the electrolyte liquid, such as resistive carbon paper or conductive plastic. Furthermore, elaborate servo control systems have been developed for electromechanically positioning a probe element with respect to the moderately conductive medium, e.g., carbon paper. While these prior art controlled field devices have been refined with technical and mechanical skilled, they are nevertheless confined to the slow inertially limited speeds of mechanical systems. Moreover, the frictional contact between the probe electrode and the moderately conducting medium in the prior art devices causes constant wear on the components, with attendant degradation of performance and periodic replacement of the component parts. The above limitations become manifest where conventional controlled field analog devices are incorporated in an otherwise wholly electronic computation system. For example, it is often desirable to store information in analog form for processing by an electronic analog computer. Controlled field devices in many ways provide a convenient means for such storage, but the above-mentioned limited response time and component wear degrades the performance of the entire computer system.

SUMMARY OF THE INVENTION

Accordingly, it is a broad object of the invention to provide a controlled electric field analog device which is capable of operating at exceedingly fast speeds, i.e., response times, characteristic of electronic mechanisms.

It is another important object of the invention to eliminate the mechanical contact between the probe element and the moderatey conductive medium of a controlled electric field analog device.

It is a further object to provide an improved analog device.

Now, according to the present invention, a beam of electromagnetic radiation, for example light, is utilized to probe and initiate a sampling mechanism of the potential appearing at any position on an analog voltage plot generated in a moderately conductive film. In particular, a photoelectric element is disposed between this film and a contact, to provide a means for electrically connecting any selected point on this film with the contact in response to the beam of radiation. Means are provided for monitoring the electrical signal appearing at the contact.

BRIEF DESCRIPTION OF THE DRAWINGS

Further objects will become apparent, and my invention itself, both as to its principles and its particular embodiments, will be better understood by referring to the specification herein and the accompanying drawings, of which.

DETAILED DESCRIPTION OF PREFERRED EMBODIMENTS

Figure 1:
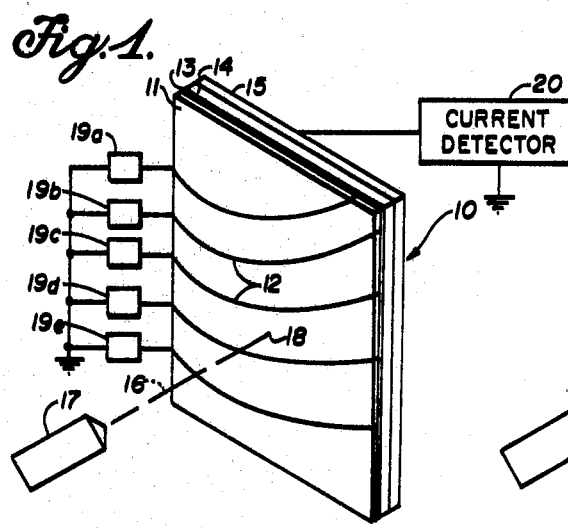
FIGURE 1 is a pictorial view of a controlled electric field analog wafer incorporating in particular a photoconductive material for the photoelectric layer.

Referring to FIGURE 1, there is shown a controlled electric field wafer 10, including an optically transparent glass layer 11 with field-defining electrodes 12 arranged on one surface thereof. The surface of glass layer 11, provided with electrodes 12, is coated with an optically transparent moderately conductive silicon film 13 exhibiting intimate electrical contact with each of electrodes 12 which are preferably of a thickness approximating that of film 13 to ensure uniform electrostatic gradients in the planes thereof. To the exposed surface of film 13, a layer of photoconductive material, such as cadmium sulfide, is deposited thereon, providing electrical contact between film 13 and photoconductive layer 14. A final layer of highly conductive material provides contact 15, such as a thin sheet of gold, copper, mercury or zinc. A series of constant voltage sources 19a–e, each having two terminals, are connected with one of their terminals to a common reference ground and each of the other terminals individually to electrodes 12. Current detector 20, e.g., a current meter, is arranged in an electrical path between electrode layer 15 of wafer 10 and ground.

A beam of electromagnetic radiation 16, emanating from beam source 17 and having a frequency adjacent to or within the visible light range, is directed toward the exposed surface of glass layer 11 of wafer 10, and is preferably in a generally normal relationship therewith.

In operation, each of voltage sources 19a–e are set at a preselected potential to provide, together with the orientation of electrodes 12, a particular electric field gradient pattern within and on film 13. Thus, the voltage appearing on moderately conductive film 13 between any two adjacent electrodes 12 along electric field lines drawn perpendicular to those electrodes is the potentiometric interpolation between the voltage potentials on the associated adjacent electrodes 12. Accordingly, wafer 10 provides a representation of three variables of a three-order function or empirical relationship. Two of the variables are represented along the horizontal and vertical axis of the wafer, and the third is represented by the analog voltage potential on film 13.

In order to sense this third variable parameter, beam 16 is employed to excite and reduce the resistance of a particular localized volume (point 18) of photoconductive layer 14, thereby providing substantial electrical communication between point 18 on conductive coating 13 and contact 15. Photoconductive material 14 is selected with a large light-to-dark resistivity factor, e.g., a factor $10^6$ is available for photoconductive cadmium sulfide. (Design Considerations in Selecting Photoconductive Cells, 1962, obtainable at Owensboro Office, General Electric Company, Owensboro, Ky.) Thus, layer 14 provides only slight conductance in the absence of beam 16. However, upon the impingement of radiation beam 16 on photoconductive layer 14, the resistance thereof decreases, due to charge carrier excitation, by several orders of magnitude, at the localized beam position 18. This mechanism provides for greatly increased current flow between film 13 at position 18 and contact 15 proportional to the voltage potential present on film 13 at position 18 with respect to ground. Accordingly, for any coordinate position of beam 16 on wafer 10, a third variable, i.e., voltage, functionally related to this position by the field pattern appearing on film 13, is measured in the form of a current signal by current detector 20.

In construction of wafer 10, silicon film 13 is formed by heating glass layer 11 with electrodes 12 attached, exposing the surface of layer 11 with electrodes 12 to vapors of silicon, and cooling glass layer 11 in a reducing atmosphere. Alternatively, vapors of tin or titanium chloride may be substituted for silicon. Furthermore, film 13 may be formed by spraying a solution of stannous chloride in actone on glass layer 11, with the latter heated to just below its melting point. In general, the following materials will provide transparent conductive layers of characteristics suitable for application in the instant invention: silicon, silicon oxide and other silicon compounds; plastics; fluorides; compounds of tin, indium or cadmium or of other metals, preferably their oxides or halides; or silicates or borates. For example, a conductive transparent plastic of sufficient rigidity to support the deposition of photocondutive layer 14 and contact 15 may be used as a substitute for the combination glass layer 11 and film 13. The conductive coating or film 13 should preferably have a resistance in the range of 1 to $10^6$ ohms per square, where this resistance parameter is defined as the impedance measured across opposing edges of a square sheet of the conductive substance. The plurality of metallic strip electrodes 12, as shown in FIGURE 1, are preferably used in an embodiment of the invention requiring an electric field pattern continuously varying over the area of the conductive film 13. It will be recognized, however, that the use of electrodes of any dimensions or number which provide a desired potential field in accordance with electrostatics is anticipated.

In general, any photoconductive layer having a light-to-dark resistivity ratio greater than $10^3$ is suitable for layer 14 of wafer 10. For example, the material may be inorganic or organic, crystalline or amorphous. These material may be used in the form of micro crystalline powders; thin sintered; evaporated, chemically deposited; or sputtered layers. Preferably, cadmium sulfide 15 is used, which may be deposited on conductive coating 13 by procesess well known in the art. For example, a layer of photoconductive cadmium sulfide having a resistivity of $10^4$ ohms cm.$^3$, a "light" to "dark" resistivity ratio of $10^5$, and a thickness of 2.5 mm. provides a "dark" resistence of 100 ohms for the entire layer, i.e., the resistance between two highly conductive contact layers separated by the photoconductive layer. When excited by a beam of radiation having cross sectional area of 1 mm.$^2$, the local resistance of the photoconductor at the point of impingement decreases to approximately 2 ohms.

Contact 15 may be constructed from any substance exhibiting high electrical conductance; however, a metallic material such as gold, copper or silver is preferred.

Radiation beam 16 is a constant intensity light source having a frequency or frequencies within the spectral response range of the photoconductive material used for layer 14. For example, cadmium sulfide has a sensitivity range extending through the visible spectrum and peaking at a wavelength of 5,000 A. Accordingly, a blue-green light source would be suitable for this photoconductive substance. The intensity of beam 16, while selected for compatibility with the sensitivity of a particular layer 19, is preferably of the order of 1–100 lumens/ft.$^2$ to provide sufficient excitation energy for common photoconductive materials.

Figure 2:
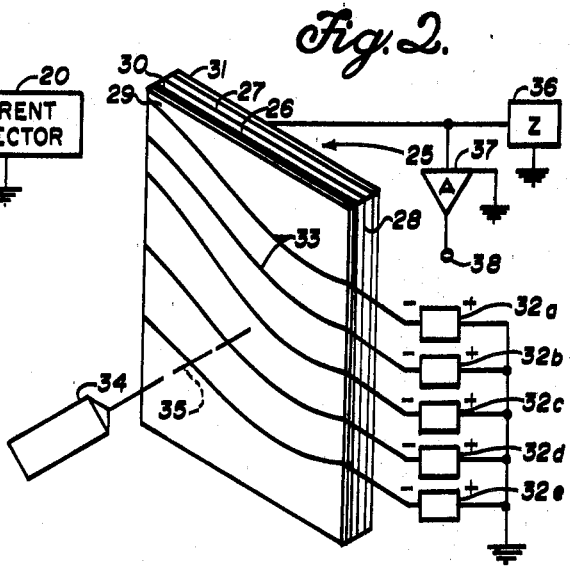
FIGURE 2 is a front pictorial view of a field wafer utilizing a photo-effect junction semiconductor for the photoelectric layer.

FIGURE 2 depicts a field wafer 25 in an arrangement similar to that of FIGURE 1, with a solid state photodiode tier comprising p and n doped layers 26 and 27, respectively. A photodiode junction 28, defined by the joinder of layers 26 and 27, provides the photosensitive mechanism in this embodiment, as compared with the photoconductive characteristics of layer 14 of FIGURE 1. Glass layer 29, conductive film 30, electrodes 33, and contact 31 are provided in wafer 25 as described above for FIGURE 1. Constant potential voltage sources 32a–e are electrically connected individually to field defining electrodes 33 and a reference ground. Beam source 34 emits a collimated beam 35 of constant electromagnetic radiation intensity toward field wafer 25. Impedance 36, arranged between ground and electrode layer 31, senses current flow in the circuit and provides a voltage drop proportional thereto for input amplifier 37. The output of amplifier 37 appears at terminal 38.

Operation of the apparatus in FIGURE 2 is similar to that of FIGURE 1. However, voltage sources 32a–e must be poled so as to render junction 28 in a reversed biased mode in accordance with the mechanism of conventional photodiode circuits. Thus, the potential appearing on film 30, while varying from point to joint as the electric field pattern dictates, is poled negative with respect to ground in accordance with the particular orientation of p and n layers 26 and 27 shown in FIGURE 2. Upon excitation of a given coordinate position by beam 35 on wafer 25, photo junction 28 responds thereto, allowing current flow between film 30 and contact 31 in proportion to the reverse bias voltage present on film 30 at that position. This response signal is detected by impedance 36 in the form of a voltage drop thereacross, which is amplified by amplifier 37, and presented at terminal 38.

In forming photodiode junction 28, a layer of doped silicon or germanium is deposited on film 30. The exposed surface of the semiconductor material is then oppositely doped by a vapor diffusion process well known to those skilled in the art. It is noted that conventional photodiodes have a wavelength response ranging from infrared through X-rays. Accordingly, beam source 34 is selected to provide a constant intensity source of radiation wavelength within this wide range. Moreover, the output response to variations in light intensity, e.g., light-to-dark time response, may extend to $10^9$ cycles per second for state of the art photodiodes. The response to conventional photoconductors is limited to the range of $10^5$ cycles per second. Thus, the photodiode embodiment as shown in FIGURE 2 is preferable over that of FIGURE 1, where exceedingly fast response times are desirable.

Figure 3:
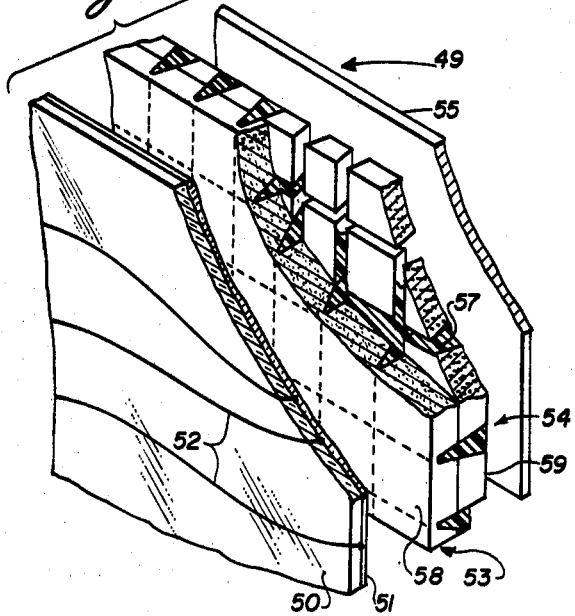
FIGURE 3 shows the separate layers of an alternative embodiment of the composite field wafer.

FIGURE 3 shows a preferred embodiment of a field wafer 49 incorporating a photoconductive substance as the active photoelectric layer. More particularly, there is shown in FIGURE 3 a glass substrate layer 50 provided with a conductive coating film 51 and field defining electrodes 52 embedded therein. Disassembled from film 51 is a segmented sheet of photoconductive material 53, and, in intimate contact therewith, a conforming segmented layer of resistive material 54. Also shown, detached, is highly conductive contact layer 55. Layers 53 and 54 are divided into small increments, e.g., 5 mm. on an edge, to provide isolated composite segments of photoconductive and resistive materials. More particularly, each segment, defined by insulating wedges 57, and comprised of a photoconductive segment 58 together with a resistive segment 59, is interposed between radiation transparent film 51 and contact layer 55.

In construction of this embodiment, a continuous photoconductive layer is deposited in film 51 as disclosed in relation to FIGURE 1. To the surface of the photoconductor, an additional tier of resistive material is deposited thereon. Operating on the exposed resistive layer, a plurality of orthogonal wedges 57 are inscribed or etched therein, extending into the photoconductive layer, but not penetrating conductive film 51. Accordingly, the continuous sheets of photoconductor and resistive material are divided into a number of segmented composite photoconductive and resistive tiers, electrically isolated from one another along the planes parallel with layers 58 and 59.

Contact layer 55 is laminated upon the segmented resistive material, providing intimate electrical contact therewith. The deposition of metallic layer 55 should not fill wedges 57. Thus, a suitable insulating material should be deposited therein.

In operation of the field wafer shown in FIGURE 3, resistive layer 54 provides spatial separation between photoconductive layer 53 and electrode 55, so as to reduce capacitive coupling between contact layer 55 and film 51. This is beneficial to the response characteristics of the field wafer when used in the apparatus shown in FIGURE 1, particularly where there are large potential variations over the surface of film 51. Moreover, insulating wedges 57 enhance the performance of the field wafer by eliminating the conductive path through photoconductive material 53 and resistive material 54 in the planes thereof parallel to layers 53 and 54. Even though the dark resistivity of the photoconductive material may be in the order of $10^4$ ohms cm.$^3$, without insulating wedges 57, a significant amount of current may flow along the planar direction of photoconductive layer 53 between differential voltage potentials appearing on film 51. This in current flow would electrically load film 51 and degrade the performance of the device. Thus, in FIGURE 3, photoconductive segment 58 acts as a shunt resistance with respect to film 51, only over the area defined thereby. The voltage differential appearing on film 51 within this localized area may be made as small as desired by decreasing the rectangular dimensions of segments 58, 59.

Figure 4:
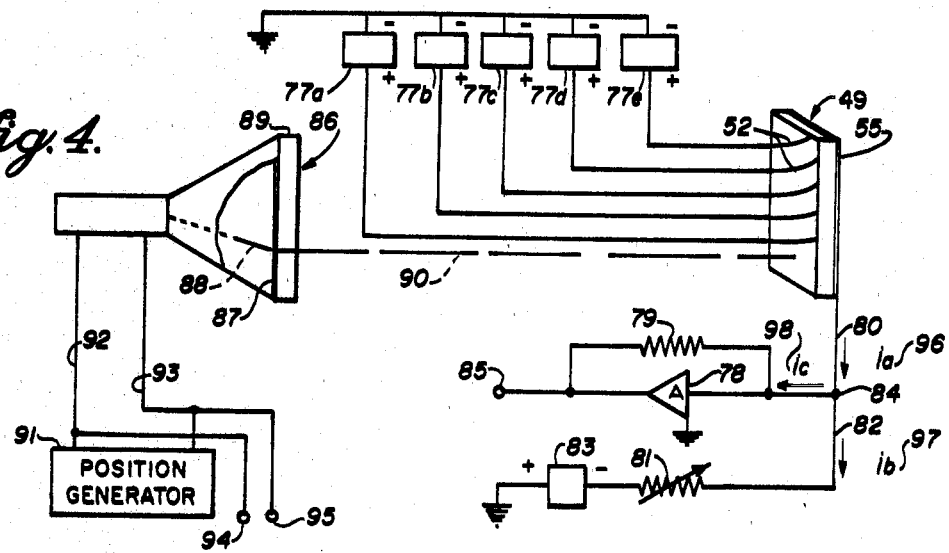
FIGURE 4 is a diagram of an electronic analog computer utilizing an oscilloscope as a means to probe a controlled field analog wafer.

The apparatus shown in FIGURE 4 is an electronic analog computer, including a field wafer 49 of the type shown in FIGURE 3, adapted with field-defining electrodes 52. Attached between ground and each of electrodes 52 are constant potential voltage supplies 77a–e. An operational amplifier 78, together with feedback resistor 79, is arranged to receive an input signal on line 80 from contact layer 55 of wafer 49 and a bias signal on line 82 from a constant current bias source comprised of unidirectional voltage supply 83 serially connected with variable impedance 84. The input to operational amplifier 78 appears at junction 84, while the output thereof is presented at terminal 85. Oscilloscope means 86 is shown ith a photoemissive surface 87 which is arranged to intercept electron beam 88 and emit light in response thereto. A fiber-optics plate 89 is disposed on the face of oscilloscope means 86 to direct the light emitted by surface 87 in a beam 90 toward wafer 49. A position generator 91 is provided having $x$ and $y$ deflection signal lines, respectively, 92 and 93, connected to deflection means (not shown) of oscilloscope means 86 for positioning beam 90. The $x$ and $y$ signal outputs of generator 91 are concurrently presented at terminals 94 and 95, respectively.

In operation, position generator 91 transmits preselected $x$ and $y$ deflection voltage signals along lines 92 and 93 to oscilloscope means 86. In response thereto, light beam 90 is directed toward the coordinate location on wafer 49 defined by the given deflection signals. The photoconductive layer of wafer 49 at this coordinate location is thus switched to a low resistance state due to the local excitation thereof by beam 90, as described above. It is noted here that junction 84, the input to operational amplifier 78, is at virtual ground, i.e., essentially zero voltage, in accordance with the well known mechanism of operational amplifiers. Thus the voltage potential on the conductive coating of wafer 49 at the position of beam 90 appears across the serial arrangement of the photoconductor and contact layer of wafer 49. A response current is thus generated proportional to this voltage and directed toward junction 84. Superimposed on this response current is a relatively small quiescent current introduced by the average voltage appearing on the conductive coating, as applied across the finite "dark" resistance of the photoconductive layer and the constant resistance of the resistive layer of wafer 49. The sum of this quiescent current and the relatively larger response current is represented by $i_a$, 96 flowing toward junction 84. It is desirable to isolate and detect only the response current portion of current $i_a$, 96 which represents the analog data presented by wafer 49. Thus, a serially arranged voltage source 83 and variable resistor 81 are connected between ground and junction 84, providing a current flow $i_b$, 97 away from junction 84, as shown. Resistor 81 is of a sufficiently high impedance to render the combination thereof with source 83 a current source. Moreover, resistor 81 is adjusted to allow current $i_b$, 97 to equal the quiescent current portion of current $i_a$, 96. Accordingly, current $i_c$, 98 flowing into operational amplifier 78 represents only the current responsive to an application of beam 90 on wafer 49. In response to current $i_c$, 98, operational amplifier 78, in conjunction with feedback resistor 79, presents a negative voltage at terminal 85 in proportion to current $i_c$, 98. This voltage output, herein denoted as $z$, is in turn proportional to the analog potential on the conductive coating of wafer 49 at the selected position of beam 90.

Thus, with the use of position generator 91, two independent voltage variables, $x$ and $y$, are selected thereby and presented at terminals 94 and 95. A third voltage variable, $z$, appears at terminal 85, which is functionally related to $x$ and $y$ by the field pattern generated on the conductive film of wafer 49.

Additionally, the embodiment of FIGURE 4 may be modified by introducing a controlled variation in the intensity of beam 90, thus providing a fourth variable. In such an embodiment, the analog signal $z$ appearing at terminal 85 would be dependent on $x$ and $y$, the coordinate position of beam 90, and further dependent on a fourth variable $w$, which would be a function of the intensity of beam 90.

Figure 5:
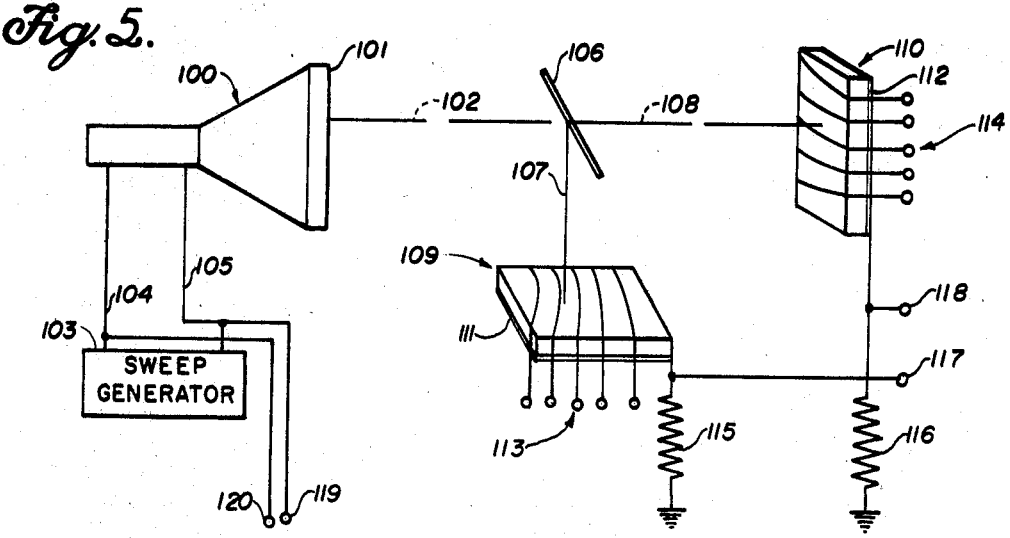
FIGURE 5 pictorially shows a further embodiment of the invention.

FIGURE 5 shows a controlled field analog computer providing a fourth variable. More particularly, as depicted therein, an oscilloscope means 100, adapted with a fiber optics face plate 101, generates and positions a light beam 102 in response to an output of sweep generator 103 which is connected to the deflection system (not shown) of oscilloscope means 100. In particular, sweep generator 103 produces synchronized $x$ and $y$ deflection signals on lines 104 and 105, respectively, thereby generating a preselected beam sweep pattern on the face of oscilloscope means 100. For example, such a pattern may be circular, elliptical, or any other desired scheme within the capabilities of the art. A pellicle 106 is disposed at a 45° angle in relation to the face of oscilloscope means 100 and provides for splitting beam 102 into orthogonally related component beams 107 and 108. Arranged to intercept each of beams 107 and 108 are wafers 109 and 110 of the type described and shown with FIGURE 1. Each of wafers 109 and 110 are adapted with a separate set of terminals respectively shown by reference numerals 113 and 114, to which constant voltage supplies (not shown) are attached, as also described with FIGURE 1. Resistors 115 and 116, selected to be of high impedance so as not to overload the moderately conductive films of wafers 109 and 110, are separately connected between contact layers 111 and 112 and ground. Terminals 117 and 118 provide voltage output analog signals responsive to the currents flowing through resistors 115 and 116, which currents correspond to the analog potentials present on wafers 109 and 110 at the positions of beams 107 and 108, as described in conjunction with FIGURE 4. Terminals 119 and 120 provide access to $x$ and $y$ voltage deflection signals emanating from sweep generator 103 to allow monitorin gof the variables which control the position of beams 107 and 108.

For a given sweep function of generator 103 and preselected electrical field patterns for wafers 109 and 110, the outputs presented at terminals 117 and 118 are defined periodic electrical signal functions. For example, sweep generator 103 may be designed to generate a diagonal line path across the face of each of wafers 109 and 110, while the electric field patterns thereof may be selected to represent a plot of the base current, collector-emitter voltage and current of two different types of transistors. Orienting the diagonal line path of light beams 107 and 108 to coincide with the dynamic load line of a transistor amplifier circuit, the analog output voltages or currents may be detected at terminals 117 and 118 and compared, providing a comparative analysis of an in situ operation at two different types of transistors.

In a further embodiment of the invention (not shown), separate oscilloscope means may be incorporated for each of three field wafers so that equal potential points may be located in a three-dimensional analog representation of a physical system. In such a system, each wafer would represent the potential field pattern of a dimensional plane. This latter embodiment would be of particular utility in the design of devices such as photo-multiplier tubes where the three-dimensional characteristics of electrostatic potentials are of primary importance.

Alternatively to the foregoing embodiment, the field wafers may be made with sufficiently thin layers to provide for transparency through the entire lamina. Thus, the field wafers may be stacked in parallel and a single beam employed to transpierce and excite each of the photoelectric layers.

It will be apparent to those skilled in the art that various changes in the details of construction described hereinbefore may be made without departing from the spirit of this invention. For example, while the applicant has disclosed embodiments of a controlled electric field wafer useful with a beam of a radiation proximate to or within the range of visible light frequency, it is noted that other radiation frequencies may be used. Many photoconductive materials are sensitive to infrared, while a number of state of the art photodiodes exhibit useful response characteristics in the range of X-ray radiation. Thus, by incorporating any of these available materials as the photoelectric layer in controlled field wafers such as those shown in the drawings, and selecting the exciting beam source to have a frequency commensurate with that of the spectral response of the given photosensitive layer, numerous variations and specializations of the invention herein described will be recognized by those skilled in this art.

I claim:
1. An electrical analog device for use with a positionable beam of electromagnetic radiation, comprising:
  (a) a controlled electric field means including a moderately electrically conductive film for generating a preselected analog voltage pattern having voltage potential variations between separate points on said pattern, and a plurality of metallic electrodes arranged in intimate electrical contact therewith, each of said electrodes being supported on a transparent member and each having a terminal for simultaneously receiving a separate constant voltage with respect to a common reference ground;
  (b) an electrically conductive contact layer; and
  (c) an electromagnetic radiation sensitive means including a photoelectric element layer interposed between said conductive film of said field means and said contact layer for providing a single positionable low impedance path between a selected point on said pattern and said contact layer when said radiation sensitive means is excited by said positionable beam of radiation.

2. The device recited in claim 1, further defined by said photoelectric element layer having a light-to-dark resistivity ratio greater than $10^3$.

3. The device in claim 1, wherein said photoelectric element layer is a sheet of photoconductive material having a light-to-dark resistivity ratio greater than $10^3$.

4. The device in claim 1, wherein said photoelectric layer is a photosensitive diode wafer having a junction plane parallel to the planes of said film and contact layer.

5. The apparatus in claim 3, further including electrical means connected between said contact layer and said reference ground for sensing electrical signals appearing therebetween in response to variations in the position of said low impedance path.

6. The device recited in claim 5, further including an oscilloscope means for providing said positional beam of radiation.

7. The apparatus in claim 6, wherein said transparent support member of said field means is optically transparent, and wherein said oscilloscope means comprises an oscilloscope having a light emissive screen and a fiber-optics face plate disposed in proximate and parallel relationship with said screen, whereby light emitted by said screen is collimated into a distinct beam of light radiation directed to impinge on said photoconductive layer.

8. The apparatus defined in claim 7, further including a layer of resistive material interposed in intimate electrical contact between said contact layer and said photoconductive layer; and wherein said photoconductive and resistive layers are segmented along orthogonal planes perpendicular to the planar dimension of said layers to provide a plurality of incremental photoconductive and resistive composite tiers, each substantially electrically isolated from the remainder in the planar dimension.

9. The apparatus of claim 7, wherein said photoconductive layer is cadmium sulfide.

10. The apparatus in claim 7, wherein said moderately conductive film is a silicon compound deposited on a transparent glass substrate.

11. An apparatus as in claim 7, for exciting a plurality of analog devices and further including a means for splitting said radiation beam into at least two components, a first component being directed to excite a photoconductive layer of a first analog device, and at least a second of said components being directed to excite a photoconductive layer of at least a second of said analog devices.

References Cited

UNITED STATES PATENTS

| | | | |
|---|---|---|---|
| 2,979,622 | 4/1961 | Garbuny | 250—217 |
| 3,134,907 | 5/1964 | Volberg | 235—197 X |
| 3,202,810 | 8/1965 | Steiner | 235—197 |
| 3,211,912 | 10/1965 | Schwarz | 250—217 X |
| 3,249,691 | 5/1966 | Bigelow | 250—217 X |
| 3,310,738 | 3/1967 | Ogawa et al. | 250—211 X |

MALCOLM A. MORRISON, Primary Examiner

R. W. WEIG, Assistant Examiner

U.S. Cl. X.R.

235—197; 250—211, 217